United States Patent

[11] 3,597,551

[72] Inventors Knut Arneberg
Larkollen, Norway;
James R. Gibbens, San Rafael; Klaus E. Funke, San Francisco, Calif.
[21] Appl. No. 829,003
[22] Filed May 29, 1969
[45] Patented Aug. 3, 1971
[73] Assignee Lynch Commuication Systems, Inc.
San Francisco, Calif.

[54] IN-BAND SIGNALLING APPARATUS
11 Claims, 4 Drawing Figs.

[52] U.S. Cl. .......... 179/84 VF, 179/2.5
[51] Int. Cl. .......... H04h 1/08, H04m 1/50
[50] Field of Search .......... 179/84 UF, 2.5, 17.6

[56] References Cited
UNITED STATES PATENTS
3,156,775 11/1964 Ioaicimidis .......... 179/84 UF

*Primary Examiner*—Kathleen H. Claffy
*Assistant Examiner*—William A. Helvestine
*Attorney*—Mellin, Moore and Weissenberger

ABSTRACT: Improved in-band signalling apparatus useful in the conversion of O-type frequency division multiplexing equipment for the multiplexing of rural subscriber lines is disclosed Specifically, a ring-signal-to-voice-frequency-signal converter is described which is fully transistorized for battery operation from the 48-volt battery supply of the telephone system and contains no circuit dependent on external AC power for operation. Furthermore, there is provision for transient-free frequency switching, and the circuit is suitable for use in small fully enclosed spaces. Local generation of the ringing signal is provided to obtain complete separation of the ring detection circuit from the subscriber line.

INVENTORS
KNUT ARNEBERG
JAMES R. GIBBENS
KLAUS E. FUNKE
BY Meelin, Moore & Weissenberger
ATTORNEYS INVENTORS
KNUT ARNEBERG
JAMES R. GIBBENS
KLAUS E. FUNKE
BY Mellin, Moore & Weissenberger
ATTORNEYS INVENTORS
KNUT ARNEBERG
JAMES R. GIBBENS
KLAUS E. FUNKE
BY
Mellin, Moore & Weissenberger
ATTORNEYS

IN-BAND SIGNALLING APPARATUS

BACKGROUND OF THE INVENTION

Open-wire frequency division telephone equipment (so-called O-type equipment), formerly used extensively in high-traffic areas, has in recent years been increasingly supplanted by more sophisticated high-capacity equipment using cables instead of open-wire circuits. The conversion of these open-wire circuits to cable has freed a great deal of central office O-type multiplexing equipment, most of which is still electrically sound and serviceable.

It would be economically very advantageous to telephone companies to be able to use this equipment for the multiplexing of open-wire lines between a rural central office and a remote equipment location or other distributing facility from which a number of multiparty lines branch out. Such a use requires the interposition of in-band signalling equipment at the interface between the multiplexing equipment and the subscriber lines at each end of the multiplexed span. In-band signalling equipment of this type is currently available, but such currently available equipment is economically unsuitable for conversion purposes because of its size, power consumption, and complexity; its vulnerability to the failure of commercial power, and to installation in dark locations; and its susceptibility to spurious switching, and to creating undesirable transients.

It is the objective of this invention to provide in-band signalling equipment for frequency division systems which is free of the aforesaid disadvantages.

SUMMARY OF THE INVENTION

The invention provides, basically, for battery-operated, fully encloseable semiconductor apparatus adapted to convert a selective ringing signal appearing in the tip and ring lines of a given four-party line at the central office into frequency-coded signals susceptible of being transmitted through the O-type multiplexing equipment, and decoding these frequency-coded signals with immunity to spurious signals at the subscriber end to actuate a set of relays which reliably impress the proper selective ringing signal on the four-party subscriber line. In the other direction, off-hook condition and dial pulses are relayed to the central office switching matrix by producing, at the remote equipment location and without reference to an external AC power supply, an on-hook signal coded for recognition in accordance with the principles described in U.S. Pat. No. 3,061,783.

It is therefore the object of this invention to reliably and economically add in-band subscriber signalling capability to frequency division multiplexing equipment.

It is another object of the invention to provide equipment of the type described which has low power requirements, is independent of the commercial power supply, and is capable of being installed in small, enclosed spaces.

DESCRIPTION OF THE PREFERRED EMBODIMENT

Figures 1, 3B:
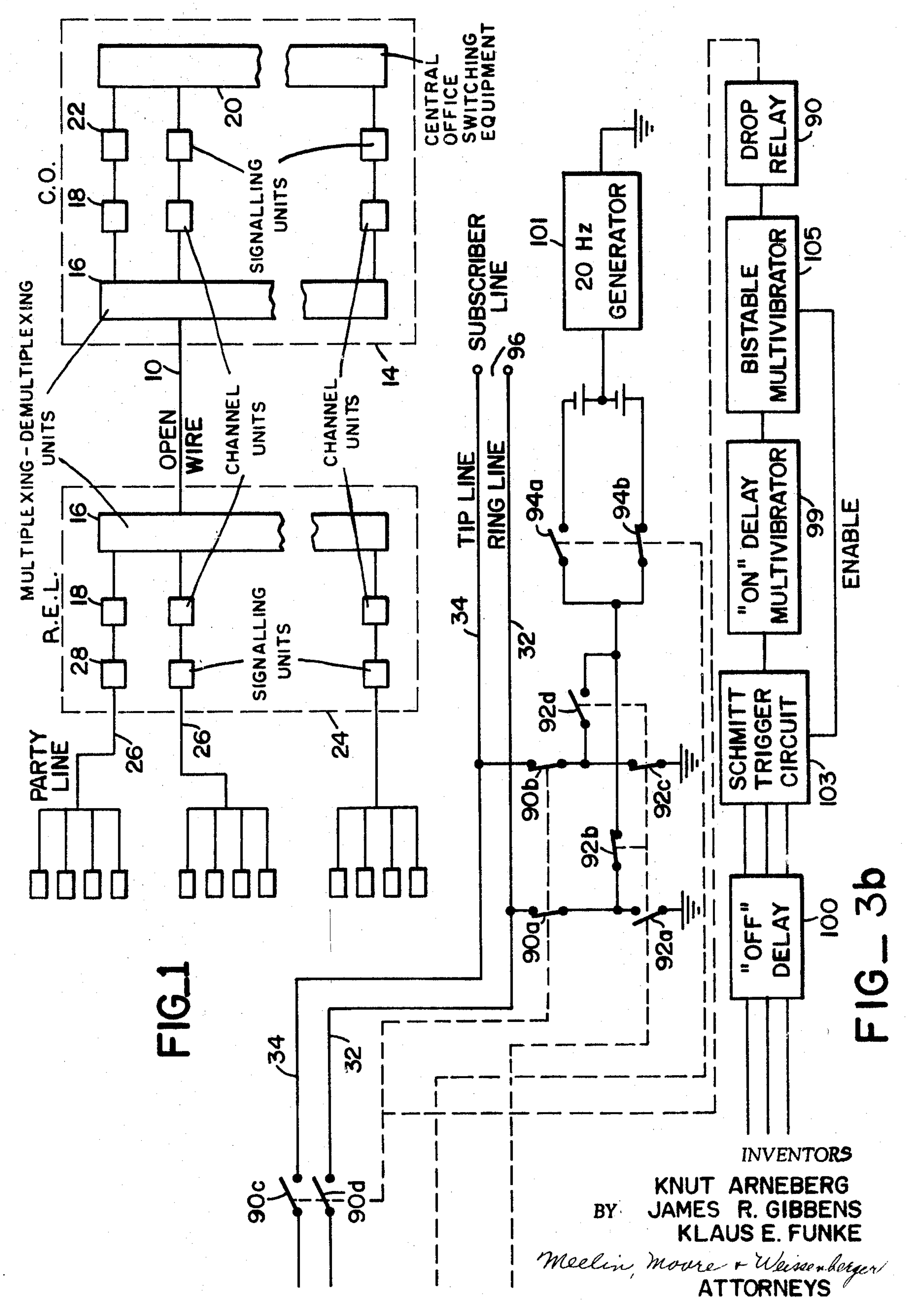
FIG. 1 is a block diagram illustrating the environment in which the equipment of this invention operates.
FIGS. 3*a* and 3*b* constitute a block diagram of the remote equipment location in-band signalling equipment of this invention.

FIG. 1 shows the general environment of the invention in block form. An open-wire 10 connects a central office with a remote equipment location 24. At each office, there is a multiplexing-demultiplexing unit 16 and a plurality of channel units 18 (typically 16 arranged in groups of four).

At the remote equipment location 24, there is not switching matrix, and the channel units 18 of the frequency division system are tied directly into 16 four-party subscriber lines 26 through the signalling units 28. The signalling units 22 and 28 are shown in more detail in FIGS. 2, **3*a* and 3*b***, respectively.

Figure 2:
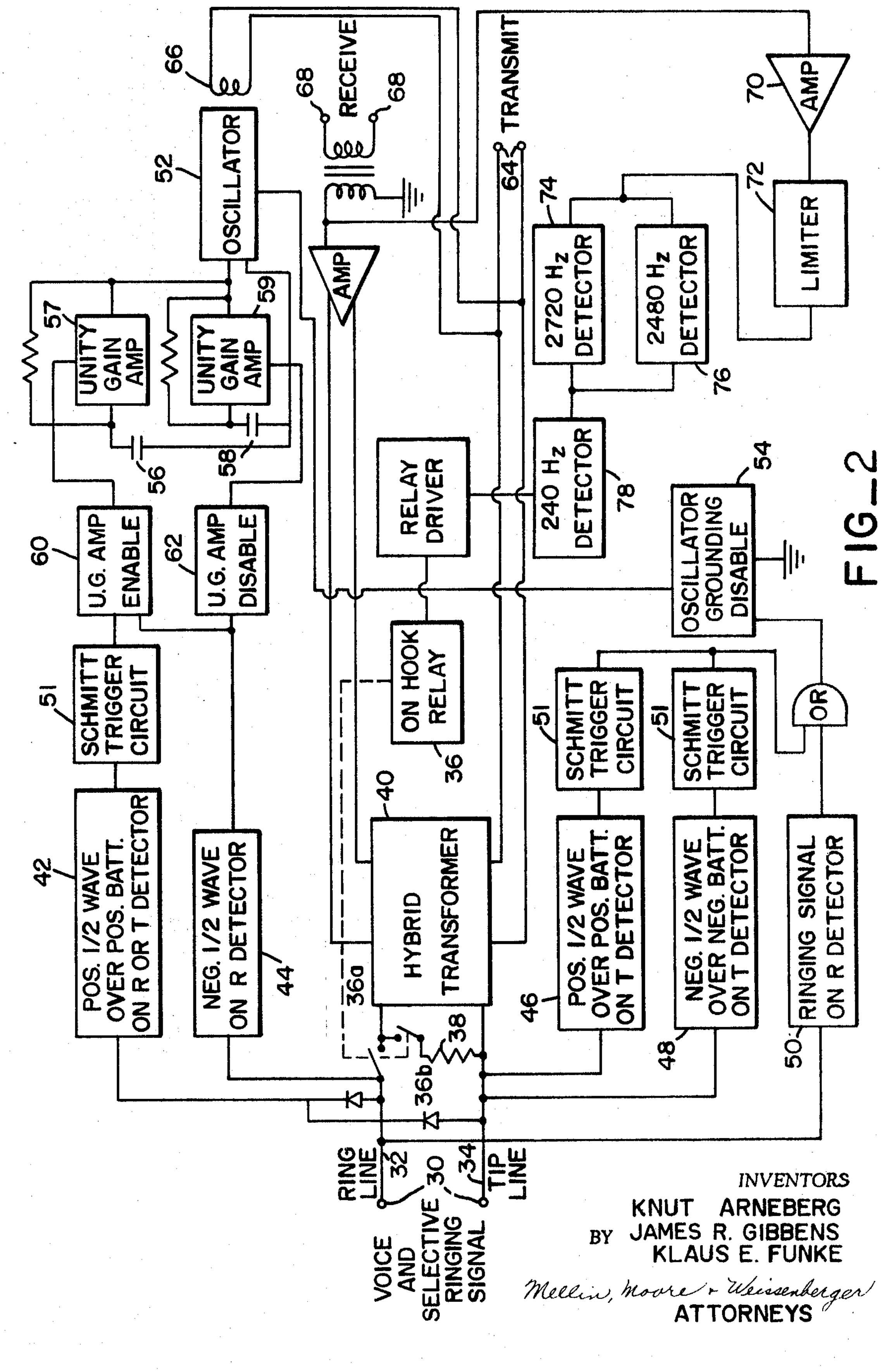
FIG. 2 is a block diagram of the central office in-band signalling equipment of this invention.

The overall operation of the system to which this invention relates is best understood by a consideration of FIGS. 2 and **3*a*, 3*b*. Referring first to FIG. 2, the subscriber line output for a given channel of the subscriber switching matrix 20 is shown at 30. In accordance with the usual telephone practice, selective ringing of the four parties on a four-party line is accomplished by impressing across the ring line 32 and tip line 34** one of the following combinations of signals:

1. ringing signal superimposed upon positive battery on the ring line, with the tip line grounded (R+ ring);
2. ringing signal superimposed upon negative battery on the ring line, with the tip line grounded (R− ring);
3. ringing signal superimposed upon positive battery on the tip line, with the ring line grounded (T+ ring);
4. ringing signal superimposed upon negative battery on the tip line, with the ring line grounded (T− ring).

Internal connections in the subscriber's receiving equipment are so made that any given subscriber's equipment is responsive to only one of these four rings.

The subscriber line 30 is suitable for a direct connection to a subscriber's line output of the subscriber switching matrix, and during the on-hook condition of the subscriber equipment, the equipment of FIG. 2 simulates an on-hook set by opening contact **36*a* of on-hook relay 36 and closing contact 36*b* to terminate the hybrid 40 through a resistor 38. In this condition, no signal can be transmitted through the hybrid transformer 40**.

When any of the four parties on line 30 is now called, a ringing signal of some kind will appear on line 30. This ringing signal is analyzed by the detectors 42, 44, 46, 48 and 50. The function of these detectors is to control the oscillator 52 so that it will produce various codes consisting of in-band frequencies switched in various sequences at the 20 Hz. frequency of the ringing signal, the sequence depending upon which of the four ringing signal condition appears in channel 30. By convention, this code is as follows:

| | | In-band signal frequency | |
|---|---|---|---|
| Battery potential | Addressed line | During positive half-wave of ringing signal | During negative half-wave of ringing signal |
| Negative | Ring | 1,950 | 2,200 |
| Do. | Tip | None | 2,200 |
| Positive | Ring | 2,450 | 1,950 |
| Do. | Tip | 2,450 | None |

TABLE 1

For example, in accordance with Table 1, an R− ring will produce an oscillator output which alternates between 2,200 Hz. and 1,950 Hz. at a 20-Hz rate. Likewise, a T− ring would produce spaced pulses of 2,200 Hz. in the oscillator output.

The level detectors 42, 44, 46, and 48 need to respond to specific half-waves of the 20 Hz. ringing signal. For reliable operation of the circuit, it is essential that the duty cycle of the detectors 42, 44, 46 and 48 be as close as possible to the full duration of the half-wave to be detected; yet they must not respond to the wrong half-wave. The necessary triggering action is normally accomplished by a neon tube whose resistance suddenly drops when it reaches its firing potential.

In the prior art open-rack equipment, neon tube detectors worked satisfactorily. However, when the circuit was miniaturized for use in compact, fully enclosed plug-in units, it was found that the lack of background lighting reduced the background ionization of the neon tubes to the point where, even with the boost of radioactive coating, their operation became unpredictable and erratic.

The present invention overcomes this problem by using, instead of neon tubes, transistorized so-called Schmitt trigger circuits 51. These circuits, though more complex than neon tube circuits, have the property of switching rapidly from a nonconducting to a conducting condition when their control voltage exceeds a predetermined threshold, the rapidity of the switching being independent of the rate at which the control voltage rises. The trigger circuits 51 enable the apparatus of this invention to maintain a clear and accurate decision level regardless of environmental conditions.

Normally, the oscillator 52 is grounded (and hence prevented from functioning) through the oscillator grounding circuit 54. When any of the detectors 46, 48, or 50 detects a condition under which the oscillator 52 is to produce an output, the oscillator 52 can function when the oscillator ground is disabled by circuit 54. The frequency at which the oscillator 52 then operates is determined either by its own internal capacitance alone or by its internal capacitance in parallel with extra capacitances 56, 58 which can be switched into and out of the circuit of oscillator 52 by enabling and disabling circuits 60, 62.

Previously known in-band signalling equipment of this type used direct switching of a capacitance and an inductance into parallel relation with the oscillator 52. Direct switching, however, produced switching transients which, though not ordinarily troublesome, were capable of producing spurious responses particularly when borderline functioning of the detection circuits resulted in very short duty cycles.

The present invention overcomes this problem by interposing between the oscillator 52 and the capacitances 56, 58 a pair of resistance-bridged unity gain amplifiers 57, 59 constructed in accordance with the copending application Ser. No. 776,670 filed Nov. 18, 1968, and entitled "Interface Device for Communications Apparatus." These bridged amplifier circuits maintain the extra capacitances 56, 58 at the level of the tank circuit of oscillator 52 at all times and thus assure rapid, transient-free switching of the oscillator output from one frequency to another. The switching itself is accomplished by selectively enabling and disabling the unity gain amplifiers 57, 59.

The coded in-band frequency signals produced by oscillator 52 are impressed upon the transmit line 64 of the multiplex channel under consideration through transformer 66. The transmission of the coded ringing signal will normally in due course result in an off-hook condition at the subscriber end. The subscriber off-hook condition causes, in a manner hereinafter described, the cessation, on receive line 68, of the on-hook signal which consists of 2,720 Hz. and 2,480 Hz tones alternating at 240 Hz. The on-hook signal is processed through amplifier 70, limiter 72, and detectors 74, 76, and 78 to release relay 36. The cessation of this signal actuates relay 36 and, by operation of the contacts 36*a* and 36*b*, connects subscriber line 30 to the transmit line 64 through the hybrid transformer 40 for voice transmission.

Figure 3A:
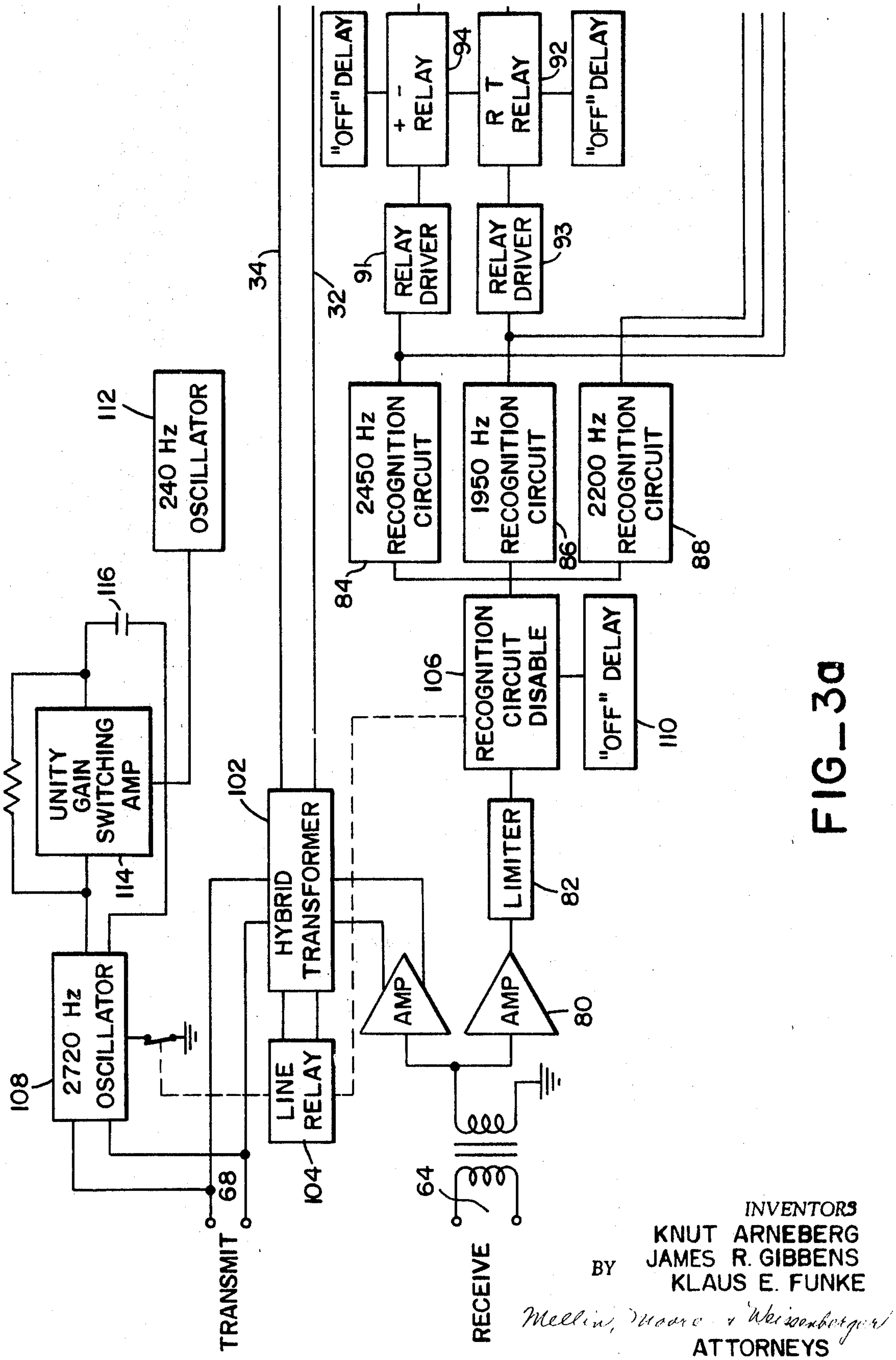

Turning now to FIG. 3*a*, *b*, the signal transmitted from line 64 of FIG. 2 is received on line 64 in FIG. 3*a*, *b* through the intermediary, it will be understood, of frequency multiplexing equipment 16. The frequency-coded ringing signal from the apparatus of FIG. 2 is processed through amplifier 80 and limiter 82 and is decoded by frequency responsive networks 84, 86, 88. The outputs of the three frequency responsive networks 84, 86, 88 are combined through "off" delay circuitry 100 in such a manner that the presence of any one or more of them actuates the Schmitt trigger circuit 103. The actuation of trigger circuit 103 produces a DC signal which enables the triggering of bistable multivibrator 105 but does not trigger it.

At the moment of actuation of the Schmitt trigger circuit 103, a momentary positive spike is produced which triggers a monostable multivibrator 99 whose switching time is about 40 ms., and which therefore provides an "on" delay for the triggering of bistable multivibrator 105. The latter is triggered by the output of multivibrator 99 and is returned to its original condition by the disappearance of the DC enabling signal when the Schmitt trigger circuit is deenergized after a 40 ms. "off" delay following the end of the last recognition circuit output as provided by delay circuitry 100. The triggering of bistable multivibrator 105 acts essentially to operate drop relay 90 whenever any of the three frequency signals are present on the line. As will be subsequently explained, it is one of the features of this invention that spurious operation of relay 90 by voice patterns in the detected frequency ranges is prevented by electronically disabling the frequency responsive networks 84, 86, 88 when the subscriber line is off-hook.

The output of frequency recognition networks 84, 86 is fed, respectively, relay drivers 91, 93 which drive switching relays 92, 94 to recreate on the subscriber line the ring represented by the particular code detected by the frequency recognition network. Delaying networks 97, 98 are provided in conjunction with the switching relays 92 and 94 to delay for at least 70 milliseconds, (but not more than 200 milliseconds, to allow alternate switching between rings when a party calls another party on the same line), the release of switching relays 92 and 94, when operated, so that the drop relay 90 has time to drop out first. The objective of this arrangement is, of course, to avoid transient spurious signalling conditions on the subscriber line 96. The delaying of the release of switching relays 92 and 94 has the further effect of maintaining the relays 92 and 94 energized during those half-waves of the ringing signal during which the identifying signal frequency to which the particular relay responds is absent.

It will be noted that switching relay 92 is the R T line selection switching relay inasmuch as contacts 92*a*, 92*b*, 92*c* and 92*d* apply the battery voltage, with a ringing signal superimposed upon it, to one of the ring or tip lines 32, 34 and ground the other, depending on the condition of relay 92. Relay 94 is the battery polarity relay, and the function of its contacts 94*a*, 94*b* is to determine the polarity of the battery voltage which is to be applied to the selected line. It will be seen from Table 1 that a response of relay 94 to a 2,450 Hz. tone will result in a recreation on subscriber line 96 of the exact ringing condition which appeared on line 30 of FIG. 3*a*.

As previously explained, the drop relay 90 is provided with both a 40 ms. on-delay 99 and a 40 ms. off-delay 100. The reason for the on-delay 99 is to permit the switching relays 92, 94 to establish the proper ring before contacts 90*a*, 90*b*, allow application of the ringing signal to the subscriber line 96. The reason for the off-delay 100 is to prevent the drop relay 90 from releasing during the half-waves of the ringing signal during which no frequency-coded signal appears on the receiving line 64, as is the case when the top line is being addressed.

The normally open contacts 90*a*, 90*b* of enabling relay 90 control the application of ringing signal to the subscriber line 96, whereas the normally closed contacts 90*c*, 90*b* disconnect the subscriber line 96 from the hybrid transformer 102 while the subscriber line 96 is being rung.

In prior art equipment of this type, it has been customary to derive the 20 Hz. ringing signal for the subscriber by detecting the repetition rate of the signalling frequency pulses and impressing the detected signal directly onto the subscriber line 96, together with an appropriate DC potential generated within the ring detection circuit.

The device of this invention improves on the prior art arrangement by generating the ringing signal at the remote equipment location by means of a separate 20 Hz. signal generator 101, and superimposing it upon the battery voltage applied to the selected line by relay 94. This arrangement provides complete electrical isolation of the ring detection circuit from the subscriber line 96 and makes unnecessary the handling of ringing power in the ring detection circuit.

When the subscriber line 96 goes off-hook in response to a ringing signal, and a pause in the ringing signal recloses contacts 90*c*, 90*d*, line relay 104 is energized and disables the frequency recognition networks 84, 86, 88 by removing the ground connection of disabling circuit 106. This prevents further actuation of the relays 90, 92, 94 and keeps the subscriber line connected to the hybrid transformer 102 for voice transmission.

A delay circuit 110 is connected to the disabling circuit 106 to provide an off-delay sufficient to prevent the frequency recognition networks 84, 86, 88 from being re-enabled during the momentary on-hook intervals which occur when the subscriber dials, to prevent dialing-caused transients from feeding back through the circuit and operating relays 90, 92 or 94. The purpose of disabling the frequency recognition circuits is to prevent spurious operation of the ring circuitry by voice patterns.

The on-hook condition is signalled back to the central office of FIG. 2 by means of an on-hook signal generator 108. It will be noted that the on-hook signal, in accordance with the teachings of U.S. Pat. No. 3,061,783 consists of 2,720 Hz. and 2,480 Hz. tones alternating at a rate of 240 Hz. In the past, it has been customary to derive the 240 Hz. switching frequency from the 60 Hz. of the commercial power line by frequency multiplication. However, this made the circuit dependent on the commercial power supply and caused failure or erratic operation when disturbances in the commercial power supply occurred.

The present invention solves this problem by generating the 240 Hz. frequency internally of the apparatus, and independently of the power source, by an oscillator 112. To prevent transients in the on-hook signal, the output of oscillator 112 is used to enable and disable a unity gain amplifier 114 to insert and remove the capacitance 116 across the tank circuit of the signal generator oscillator 108.

We claim:

1. In-band subscriber signalling equipment for frequency division multiplexed systems, comprising:

a. ring identification circuit means; and
b. switching means responsive to the ring identification made by said circuit means to produce a selected ring on the subscriber line;
c. said ring identification circuit means being electrically isolated from said subscriber line, and including a plurality of frequency recognition means, and means to disable said frequency recognition means when said subscriber line is off hook.

2. Equipment according to claim 1, in which means are provided to prevent ringing signal current from being transmitted to said ring identification circuit means.

3. Equipment according to claim 1, in which said disabling means are provided with sufficient off-delay to prevent reenabling of said frequency recognition means during dial pulses.

4. Equipment according to claim 1, further comprising onhook tone signal generating means, and in which said disabling means are actuated by the disabling of said tone signal generating means when said subscriber line goes off hook.

5. Equipment according to claim 4, in which said on-hook tone signal generating means is independent of AC power line frequency.

6. In-band signalling apparatus for connecting a frequency-division multiplexed telephone line to a subscriber line, comprising:

a. frequency recognition means arranged to sense the presence on said telephone line of a ringing signal composed of predetermined frequencies representing ring code information and to produce an output representative of said code;
b. ring-establishing means responsive to said output of said frequency recognition means for establishing a ring on said subscriber line in accordance with said code; and
c. disabling means responsive to an off-hook condition on said subscriber line in the absence of said ringing signal for preventing operation of said ring-establishing means.

7. The apparatus of claim 6, in which said disabling means operate to disable said frequency-recognition means.

8. The apparatus of claim 6, further comprising, delay means associated with said disabling means for maintaining said disabling means in operation during dial pulses on said subscriber line.

9. In-band signalling apparatus for converting ringing signals to transient-free voice frequency codes, comprising:

a. oscillator means arranged to oscillate at a first predetermined frequency;
b. reactance means;
c. resistance-bridged unity gain amplifier means connected between said oscillator means and said reactance means in such a manner as to cause said oscillator means to oscillate at a second predetermined frequency when said unity gain amplifier means is energized; and
d. means for energizing and deenergizing said unity gain amplifier means at a third predetermined frequency substantially lower than said first and second predetermined frequencies.

10. The apparatus of claim 9, in which said third predetermined frequency is a multiple of the 60-cycle commercial power line frequency, but is derived from the telephone system battery independently of said power line.

11. Apparatus for producing a delayed operation of a relay in response to the appearance of one or more of a plurality of predetermined frequencies on a telephone line, comprising:

a. a plurality of frequency signal recognition means each arranged to produce an output during the presence of one of said predetermined frequency signals on said line;
b. level detection means responsive to the presence of one or more of said outputs to produce a fixed-level DC enabling signal;
c. means for producing a current pulse at the beginning of said enabling signal;
d. delay means for maintaining said enabling signal for a predetermined time following the total cessation of said outputs;
e. bistable multivibrator means arranged to produce an output when triggered but only while said enabling signal is present;
f. monostable multivibrator delay means connected to be triggered by said current pulse and to trigger said bistable multivibrator means a predetermined time after the occurrence of said current pulse; and
g. relay means connected to be operated by the outputs of said bistable multivibrator means.